United States Patent [19]

Lee

[11] Patent Number: 4,558,110
[45] Date of Patent: Dec. 10, 1985

[54] CRYSTALLINE SILICONE-IMIDE COPOLYMERS

[75] Inventor: Chung J. Lee, Ballston Lake, N.Y.

[73] Assignee: General Electric Company, Waterford, N.Y.

[21] Appl. No.: 697,309

[22] Filed: Feb. 1, 1985

[51] Int. Cl.[4] ............................................. C08G 77/04
[52] U.S. Cl. ...................................... 528/26; 525/477
[58] Field of Search ........................... 525/477; 528/26

[56] References Cited

U.S. PATENT DOCUMENTS

| | | | |
|---|---|---|---|
| 3,325,450 | 6/1967 | Holub | 528/21 |
| 3,553,282 | 1/1971 | Holub | 538/21 |
| 4,472,565 | 9/1984 | Ryang | 528/26 |

*Primary Examiner*—Melvyn I. Marquis
*Attorney, Agent, or Firm*—Gary L. Loser

[57] ABSTRACT

There is provided a crystalline silicone-imide block copolymer comprising at least one imide-disiloxane block, wherein the imide portion of said imide-disiloxane block has a symmetrical aromatic radical as its nucleus, and at least one polydiorganosiloxane has at least about five siloxy units.

36 Claims, No Drawings

CRYSTALLINE SILICONE-IMIDE COPOLYMERS

BACKGROUND OF THE INVENTION

The present invention relates to polymeric compositions having both siloxane units and imide units. More particularly, the present invention relates to siloxane-imide copolymers which are crystalline in nature.

It is known in the art that siloxane-imide copolymers can be prepared by reacting, for example, a diaminosiloxane and a dianhydride such as benzophenone dianhydride to yield a polyamide acid having the formula

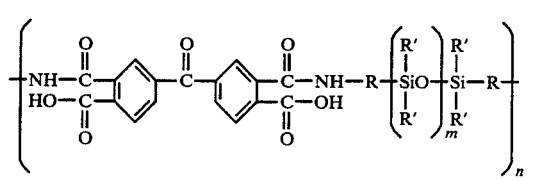

where R is a divalent hydrocarbon radical, R' is a monovalent hydrocarbon radical, m is a whole number greater than one, and n is a whole number greater than 10. Such polyamide acids are soluble in highly polar solvents such as N-methyl pyrrolidone and are provided the end-user in this form.

The siloxane-amide polymer is formed typically after the end-user has applied a coating of polyamide acid to a substrate, by heating at a temperature of from about 150° C. to about 400° C. to remove the solvent and effect cyclization to form a siloxane-imide copolymer having, for example, the formula

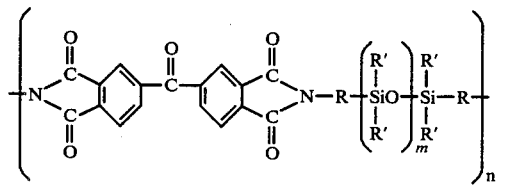

These polyimides, while useful as protective coatings for semiconductors and other electronic devices, suffer from the defect that they are insoluble in most low boiling organic solvents. Another drawback of methods which require heating the polyamide acid at temperatures of from 150° C. to 400° C. is that many semiconductor devices cannot be heated to such extremes without adversely affecting the device itself. Furthermore, the artisan will appreciate that the amide acid can hydrolyze to form carboxylic acid groups which, of course, will prevent complete imidization when the end-user attempts to use the product. Accordingly, it is desirable to provide a polyimide capable of being applied in the form of an imide rather than in the form of an amide acid.

Holub, U.S. Pat. No. 3,325,450, discloses polyimidesiloxanes of Formula II hereinabove and their preparation by reacting diaminosiloxanes and organic dianhydrides to form a polyamide acid, and thereafter heating the polyamide acid to effect imidization. Variations of Holub's teachings can be found in U.S. Pat. Nos. 3,392,144; 3,435,002; 3,553,282; 3,558,741; 3,663,728; and 3,740,305.

Berger, U.S. Pat. No. 4,030,948, discloses a polyimide copolymer which is the reaction product of a tetracarboxylic acid dianhydride, an organic diamine and a di(aminoalkyl)polysiloxane, where the di(aminoalkyl)polysiloxane constitutes 18 to 45 mole percent of the total amine requirement of the polymer.

Berger, U.S. Pat. No. 4,395,527, discloses that polyimides containing siloxane units of the formula

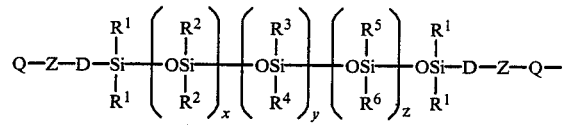

where Q is a substituted or unsubstituted aromatic group;

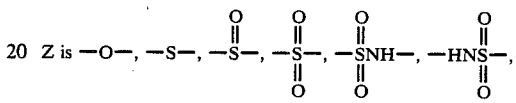

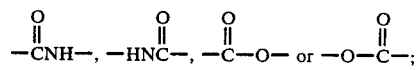

D is an unsubstituted or substituted hydrocarbylene; $R^1$, $R^2$, $R^3$, $R^4$, $R^5$, and $R^6$ are each, independently, unsubstituted or substituted hydrocarbyl radicals; and x, y and z each, independently, have a value from 0 to 100; impart improved solubility and adhesion to the polyimide. Generally, such polyimides are said to be soluble in chlorinated hydrocarbon solvents such as dichlorobenzene and trichlorobenzene, as well as in polar solvents such as N,N-dimethyl acetamide; N-methyl caprolactam; dimethylsulfoxide; N-methyl-2-pyrrolidone; tetramethylurea; pyridine; dimethylsulfone; hexamethylphosphoramide; tetramethylene sulfone; formamide; N-methylforamide; butyrolactone; and N-acetyl-2-pyrrolidone. Berger further teaches that if a diether-containing anhydride is utilized as one of the starting materials, there is obtained a polyimide soluble not only in the chlorinated hydrocarbon solvents and polar solvents previously disclosed, but also, where it contains a siloxane unit, the polyimide is soluble in a solvent which is derived from monoalkyl and/or dialkyl ethers of ethylene glycol and condensed polyethylene glycols and/or cyclic ethers containing no less than a five member ring, such as diglyme. However, Berger makes clear that polyimides will have limited solubility in diglyme. The artisan will appreciate that Berger requires the use of unusual monomers which, accordingly, are rather expensive if it is desired to obtain a diglyme soluble imide-siloxane polymer. In another aspect Berger teaches the art that polyimides containing siloxane units have a much lower glass transition temperature (Tg), e.g. on the order of 140° C. as compared with 350° C. for conventional polyimides. Consequently, they will melt and flow more readily than prior art polyimides.

SUMMARY OF THE INVENTION

It is an object of the present invention to provide crystalline silicone-imide copolymer compositions.

It is another object of the present invention to provide silicone-imide copolymers which have a lower melt viscosity than prior art silicone-imide copolymer.

Another object of the present invention is to provide silicone-imide copolymers having improved mechanical strength and solvent resistance.

In a preferred embodiment the present invention comprises a crystalline siloxane-imide copolymer composition having at least one structural unit of the formula

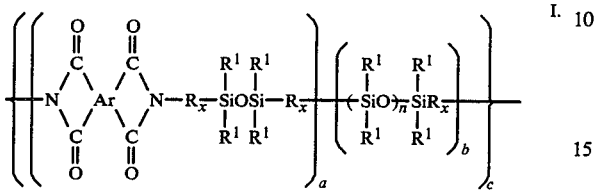

where Ar is a symmetrical aromatic radical, R is a divalent substituted or unsubstituted alkylene or arylene radical, $R^1$ is a monovalent substituted or unsubstituted hydrocarbon radical, n is an integer equal to or greater than about 5, a and b are positive integers wherein the ratio of a units to b units is such that the crystallinity of the composition is maintained, c is at least 1, and x is equal to 0 or 1.

The compositions of the present invention can further include any additional polyimide or siloxane-imide structural units with the proviso that the ratio of structural units of formula I to said additional units is such that the crystallinity of the composition is maintained.

The present invention also provides methods for making and using the silicone-imide copolymer compositions of the present invention.

DESCRIPTION OF THE INVENTION

In its broadest aspect, the present invention provides a crystalline silicone-imide copolymer composition comprising at least one imide-disiloxane block, wherein the imide portion of said imide-disiloxane block contains a symmetrical aromatic radical as its nucleus, and at least one polydiorganosiloxane block wherein said polydiorganosiloxane block has at least about five siloxy units.

A preferred embodiment of the present invention comprises a crystalline silicone-imide copolymer comprising at least one structural unit of the formula

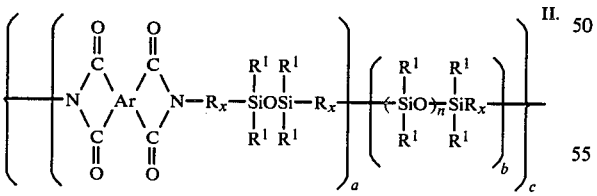

where Ar is a symmetrical aromatic radical, R is a divalent substituted or unsubstituted alkylene or arylene radical, $R^1$ is a monovalent substituted or unsubstituted hydrocarbon radical, n is an integer equal to or greater than about 5, a and b are positive integers wherein the ratio of a units to b units is such that the crystallinity of the composition is maintained, c is at least 1, and x is equal to 0 or 1.

In formula I, Ar can be any symmetrical aromatic radical such as, for example, phenyl, naphthyl and anthracyl; e.g.

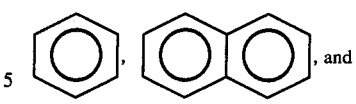

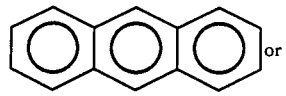

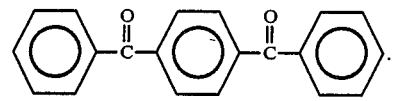

Such Ar radical can also be substituted with any suitable radical such as, for example, a halogen provided that the symmetry of the molecule is maintained and hence the crystallinity of the copolymer composition. Most preferably Ar of formula I is a phenyl radical.

R can be any divalent substituted or unsubstituted alkylene or arylene radical and, in the broadest embodiment of the present invention, need not be present at all. Accordingly, it will be appreciated that the imide nitrogen can be bonded directly to a silicon atom. Those skilled in the art will appreciate that R can be only arylene, or a mixture thereof. Preferably R is a radical of the formula

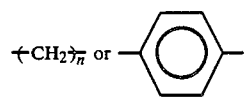

where n is an integer from 0 to 10, preferably from 1 to 5, and most preferably is from 1 to 3.

$R^1$ is an independently selected monovalent substituted or unsubstituted hydrocarbon radical typically bonded to silicon atoms of polydiorganosiloxanes. Among the more preferred $R^1$ radicals are lower alkyl radicals such as methyl, ethyl, propyl and butyl radicals; phenyl radicals; vinyl radicals, 3,3,3-trifluoropropyl radicals and the like. Most preferably $R^1$ is methyl or a mixture of methyl and phenyl. Preferably all of the $R^1$ radicals bonded to the disiloxane are the same in order to preserve the compositions crystallinity. If these radicals differ from one another it is possible that the composition will become amorphous. Those skilled in the art will be able to select suitable $R^1$ radicals without undue experimentation.

The number of imide-disiloxane units, e.g. the value of a, can be any positive integer. In the usual case, a can vary from 1 to about 100, but preferably is from about 3 to about 40, and most preferably is from about 10 to about 20.

The number of polydiorganosiloxane units, e.g. the value of b, can also be any positive integer provided that it does not adversely affect the crystallinity of the composition. Accordingly, the ratio of a to b will usually be at least unity. Typically b can vary from 1 to about 100, but preferably is from 1 to about 40, and most preferably is from about 5 to about 10.

The number of units of formula I, e.g. the value of c, is at least one. However, it is preferable that there be at least about 5, and more preferably about 10 units of formula I.

The artisan will appreciate that the imide-disiloxane units impart crystallinity to the copolymer composition of the present invention. Thus, the melting point of the crystalline structure (Tm) can be controlled by varying Ar or the number of imide siloxane units. Preferably, compositions of the present invention have a Tm of from about 100° C. to about 300° C., and more preferably from about 150° C. to about 250° C.

Similarly, the polydiorganosiloxane units impart a low glass transition temperature (Tg) to the compositions of the present invention. Moreover, the polydiorganosiloxane units also impart flexibility or softness to the compositions of the present invention. The ratio of a units to b units therefore not only must be considered in terms of preserving the crystallinity of the composition, but also in terms of controlling Tg and the softness or flexibility of the composition. Of course, Tg should be as low as possible, preferably below room temperature and more preferably below 0° C. In the most preferred embodiments of the present invention, Tg can be as low as −50° C. or more.

In addition to structural units of formula I, compostions of the present invention can further include any additional polyimide or imide-siloxane units known in the art, with the proviso that such units are present in an amount which does not destroy the crystallinity of the composition.

The additional blocks of the copolymer compositions of the present invention can be, for example, siloxane-imide blocks having units of the formula

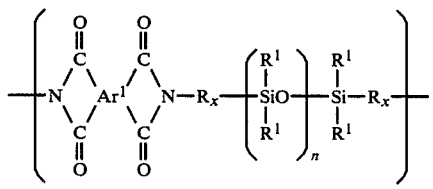

II.

where $Ar^1$ can be a tetravalent benzene or naphthalene nucleus or a tetravalent group of the formula

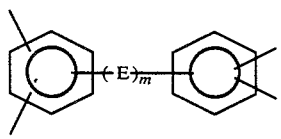

where m is 0 or 1 and E is

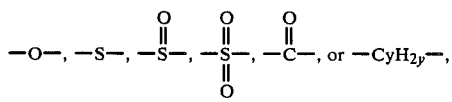

where y is an integer from 1 to 8.

In a more preferred embodiment $Ar^1$ of formula II includes diether linkages so as to increase the solubility of the final product in diglyme. Thus, in the more preferred embodiment, $Ar^1$ formula II is a tetravalent residue of the formula

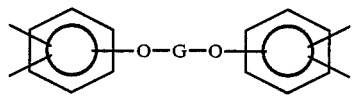

where G is phenylene or a group of the formula

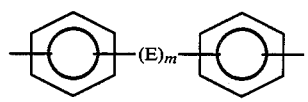

where E and m are as previously defined.

Especially preferred is an $Ar^1$ group in formula II having the formula

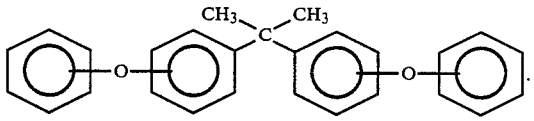

A more complete listing of suitable $Ar^1$ radicals can be found in U.S. Pat. No. 4,395,527.

R in formula II can be any substituted or unsubstituted hydrocarbylene radical, for example, a linear or branched alkylene radical having up to about 20 carbon atoms such as methylene, ethylene, propylene, isopropylene, isobutylene; an alkylene radical having up to about 20 carbon atoms which is interrupted in the chain by one or more phenylene radicals; or a radical of the formula —Q—Z—$R^3$—, where Q is any substituted or unsubstituted aromatic hydrocarbylene radical such as phenylene or naphthalene, or a heterocyclic aromatic radical where the hetero atom is selected from N, O and S; Z is —O—, —S—,

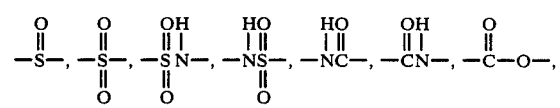

or

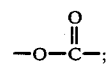

and $R^3$ is a hydrocarbylene radical within the scope of R. Preferably R is a lower alkylene radical and most preferably is propylene. These and other suitable R groups are known in the art and are described more fully in U.S. Pat. Nos. 3,325,450 and 4,395,527.

$R^1$ radicals in formula II can be any independently selected monovalent substituted or unsubstituted radicals typically bonded to silicon atoms of a polysiloxane. Among the more preferred $R^1$ radicals are lower alkyl radicals such as methyl, ethyl, propyl or butyl radicals, phenyl radicals, vinyl radicals, 3,3,3-trifluoropropyl radicals and the like. Depending upon the desired properties of the final product, the artisan can select suitable $R^1$ radicals, as well as all the other radicals, in proper ratios without undue experimentation.

Siloxane-imide blocks of formula II are useful for lowering the Tg value of the crystalline silicone-imide copolymer compositions of the present invention, and hence lowering the temperature range in which said compositions are useful.

Similarly, the artisan will appreciate that polyimide blocks which have a high Tg can be incorporated into the compositions of the present invention so as to impart thermoplastic properties to the composition.

It is particularly preferable to utilize blocks having units of the formula

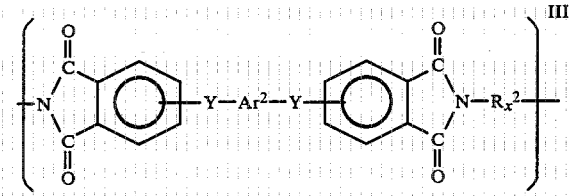

in an amount sufficient to render the composition diglyme soluble as taught in my copending patent application, Ser. No. 662,930, filed Oct. 19, 1984, assigned to the same assignee as the present invention and incorporated herein by reference.

$Ar^2$ in formula IV can be any divalent aromatic radical and preferably is somewhat narrower than the $Ar^1$ radical of formula II. That is,

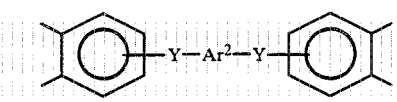 of formula III can be considered to be a subgroup of $Ar^1$ of formula II in that it requires the aromatic radical to be divalently bonded to a phenyl radical through Y, which is an oxygen or sulfur atom, and preferably is an oxygen atom. Suitable $Ar^2$ radicals in formula III are easily ascertainable by the skilled artisan.

Critical to providing diglyme soluble siloxane-imide copolymers in accordance with the present invention is that $R^2$ can only be a radical selected from the group consisting of

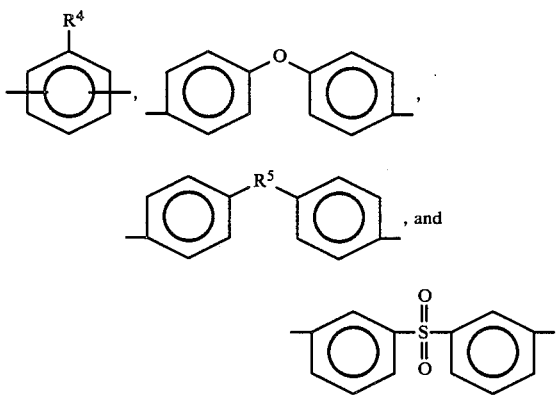

where $R^4$ is an alkyl radical having from 1 to 9 carbon atoms, preferably 1 to 3 carbon atoms and most preferably is methyl, $R^5$ is an alkylene radical having from 1 to 4 carbon atoms, preferably 1 or 2 carbon atoms and most preferably is methylene.

Compositions within the scope of the present invention can be utilized as a solventless material, e.g. the imidized composition is provided as a powder or as pellets for use in hot melt processes. The imidized compositions of the present invention can, of course, be employed as a solvent solution by dissolving the composition in a suitable solvent such as o-dichlorobenzene, chloroform, toluene or xylene. Other suitable solvents can readily be ascertained by the artisan without undue experimentation.

The compositions of the present invention find special utility in the field of protective or conformal coatings for semiconductors, electronic devices, and the like.

The preparation of polyimides and, more particularly, silicone-imide copolymers is well known in the art, for example, as taught in U.S. Pat. Nos. 3,325,450 and 4,395,527, both of which are incorporated by reference into the instant disclosure. Generally, polyimides are prepared by reacting a dianhydride with a diamine and, in the case of units of formula I of the present invention, the dianhydride has the general formula

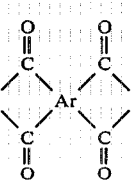

where Ar is a symmetrical aromatic radical as previously defined, and the diamine is a bis-amino-terminated disiloxane of the formula

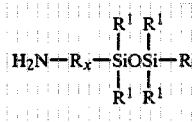

where R, $R^1$ and x are as previously defined.

Because it is important that units of formula I be present in the composition it is preferable that the aforesaid symmetrical dianhydride and bis-amino-terminated disiloxane be reacted in an environment substantially free of any monomers that are to be employed in forming other blocks of the copolymer composition of the present invention.

After the dianhydride and bis-amino-terminated disiloxane have been reacted with each other, the product therefrom is further reacted with a polydiorganosiloxane having at least about five siloxy units so as to provide blocks having units of formula I. Per mole of dianhydride there is preferably employed greater than 0.50 mole disiloxane and less than 0.50 mole polydiorganosiloxane having at least five siloxy units. More preferably, there is utilized more than 0.70 mole disiloxane and less than 0.30 mole polydiorganosiloxane per mole of dianhydride. Further reaction can be conducted in accordance with methods well known in the art.

Of course, the artisan can readily determine whether the reaction kinetics will allow all of the monomers to be employed to be combined in a single reaction vessel to obtain the compositions of the present invention.

Compositions of the present invention can be prepared in situ by adopting the teachings of U.S. patent application Ser. No. 663,003, filed Oct. 18, 1984, and assigned to the same assignee as the present invention. However, it has been found preferable to first prepare an amide acid prepolymer and thereafter effect imidization by heating. Either method, however, is within the intended scope of the claims which follow.

In order to better enable the artisan to practice the present invention, the following examples are provided by way of illustration and not by way of limitation. All parts are by weight unless noted otherwise.

EXAMPLES

Example 1

Imide-disiloxane units were prepared by placing in a three-necked round bottom flask 2.18 grams of pyromellitic dianhydride (PMDA) (0.01 mole) and 12 grams anhydrous N-methyl pyrrolidone (NMP) under rigorous agitation. After the PMDA was dissolved, 2.48 grams gamma-aminopropyldisiloxane (GAPD) (0.01 mole) was added. Reaction was effected at room temperature for 14 hours. The reaction product was then cast on a teflon die, heated at 100° C. for two hours, 150° C. for two hours and at 250° C. for one half hour to obtain an imidized materials having a melting point of 210° C., with the heat of melting being about 43.14 Joule/gram (as measured by differential scanning calorimetry at a heating rate of 10° C./min.) The glass transition temperature was 70° C. The imidized copolymer was insoluble in NMP but readily soluble in o-dichlorobenzene at room temperature.

Example 2

In this example 2.18 grams of PMDA were reacted with 1.91 grams of GAPD (0.0077 mole) in NMP at room temperature for four hours. Thereafter, 1.76 grams of bis-amino-terminated polydimethylsiloxane having eight siloxy units on average ($G_8$) (0.0023 mole) was added to the mixture. Reaction was continued for another 24 hours at which time the reaction product was cast and imidized as in Example 1. The imidized product had a glass transition temperature of about $-18°$ C. and a melting temperature which ranged from about 140° C. to about 170° C. (melting point was not sharp). The imidized product was soluble in o-dichlorobenzene at room temperature.

Example 3

Example 2 was repeated using 2.18 grams PMDA, 2.13 grams GAPD and 1.08 grams $G_8$. The imidized product had a melting temperature of 176° C., a glass transition temperature of $-18°$ C., and a heat of melting of 38.6 Joule/gram.

Example 4

In this example 4.364 grams (0.01 mold) PMDA, 4.266 grams GAPD (0.086 mole) and 4.558 grams $G_{18}$ (0.014 mole) were reacted as in the previous examples except that the solvent was a mixture of 20 ml NMP and 10 ml toluene. The reaction product was imidized at 160° C. for 2 hours under azeotropic conditions and was found to have a melting point of 184° C., a glass transition temperature of $-50°$ C., and a heat of melting of 21.5 Joule/gram.

Examples 5–7

Example 4 was repeated except the GAPD to $G_{19}$ ratio was varied as follows.

| Example 5: | .093 mole GAPD, | .007 mole $G_{19}$ |
| Example 6: | .091 mole GAPD, | .009 mole $G_{19}$ |
| Example 7: | .080 mole GAPD, | .020 mole $G_{19}$ |

The properties of these compositions, as well as those of the foregoing examples is summarized in Table I.

TABLE I

| Example | % $G_m$ | $T_g$ | $T_m$ | $H_m$ |
|---|---|---|---|---|
| 1 | — | 70° C. | 210° C. | 43.1 Joule/gm |
| 2 | 30 | $-18$ | 140–170 | — |
| 3 | 20 | $-18$ | 176 | 38.6 |
| 4 | 34.6 | $-50$ | 184 | 21.5 |
| 5 | 20.0 | — | 194 | 32.5 |
| 6 | 25.0 | — | 187 | 26.0 |
| 7 | 43.8 | $-50$ | 179 | 15.0 |

I claim:

1. A crystalline silicone-imide copolymer composition comprising at least one imide-disiloxane block, wherein the imide portion of said imide-disiloxane block contains a symmetrical aromatic radical as its nucleus, and at least one polydiorganosiloxane block wherein said polydiorganosiloxane block has at least about five siloxy units.

2. The composition of claim 1, wherein the imide-disiloxane block has the formula

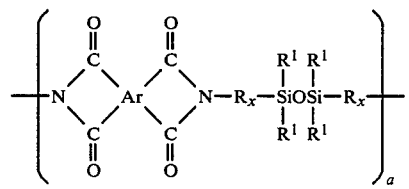

where Ar is a symmetrical substituted or unsubstituted aromatic radical; R is an independently selected divalent substituted or unsubstituted alkylene or arylene radical; $R^1$ is an independently selected monovalent substituted or unsubstituted hydrocarbon radical, and a is an integer equal to or greater than 1.

3. The composition of claim 1, wherein the polydiorganosiloxane block has the formula

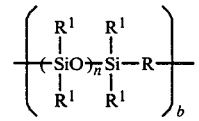

where R is a divalent substituted or unsubstituted alkylene or arylene radical; $R^1$ is an independently selected monovalent substituted or unsubstituted hydrocarbon radical, n is an integer equal to or greater than about 5, and b is an integer equal to or greater than 1.

4. A crystalline silicone-imide copolymer composition comprising at least one structural unit of the formula

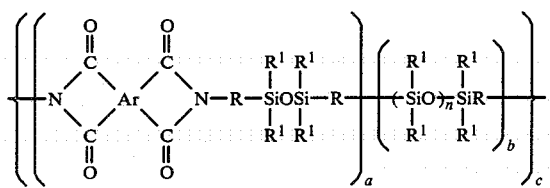

where Ar is a symmetrical substituted or unsubstituted aromatic radical; R is an independently selected divalent substituted or unsubstituted alkylene or arylene radical; $R^1$ is an independently selected monovalent substituted or unsubstituted hydrocarbon radical; n is an integer equal to or greater than about 5; a and b are positive integers wherein the ratio of a units to b units is such that the crystallinity of the composition is maintained; and c is at least 1.

5. The composition of claim 4, wherein Ar is selected from the group consisting of phenyl, naphthyl and anthracyl.

6. The composition of claim 4, wherein R is a radical of the formula

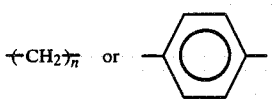

where n is an integer from 1 to 10.

7. The composition of claim 6, wherein n is an integer from 1 to 5.

8. The composition of claim 6, wherein n is an integer from 1 to 3.

9. The composition of claim 4, wherein $R^1$ is a methyl radical, a phenyl radical or a mixture thereof.

10. The composition of claim 9, wherein $R^1$ is a methyl radical.

11. The composition of claim 4 wherein a is an integer ranging from 1 to about 100.

12. The composition of claim 4, wherein a is an integer ranging from about 3 to about 40.

13. The composition of claim 4, wherein a is an integer ranging from about 10 to about 20.

14. The composition of claim 4, wherein b is an integer ranging from 1 to about 100.

15. The composition of claim 4, wherein b is an integer ranging from 1 to about 40.

16. The composition of claim 4, wherein b is an integer ranging from about 5 to about 10.

17. The composition of claim 4, wherein c is an integer greater than about 5.

18. The composition of claim 4, wherein c is an integer greater than about 10.

19. The composition of claim 4, wherein the $T_m$ is from about 100° C. to about 330° C.

20. The composition of claim 4, wherein $T_m$ is from about 150° C. to about 250° C.

21. The composition of claim 20, wherein Tg is below 0° C.

22. The composition of claim 4, further comprising at least one polymeric block having the formula

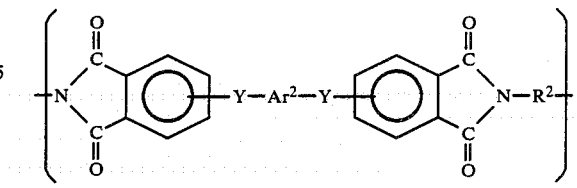

where $Ar^2$ is a divalent aromatic radical, $R^2$ is a radical selected from the group consisting of

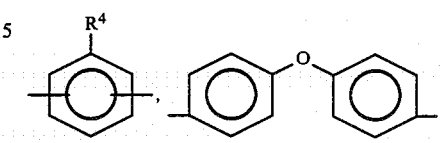

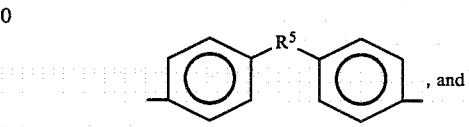

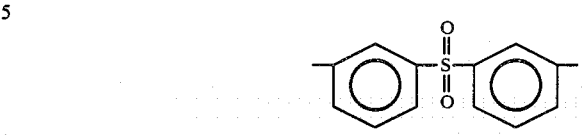

where $R^4$ is an alkyl radical having from 1 to 9 carbon atoms, $R^5$ is an alkyl radical having from 1 to 4 carbon atoms, and Y is oxygen or sulfur.

23. A method for making a crystalline silicone-imide copolymer composition, comprising:
I. reacting in a suitable solvent or mixture of solvents:
(a) at least one bis-amino-terminated disiloxane with
(b) at least one dianhydride having a symmetrical aromatic radical as its nucleus, and
(c) at least one polydiorganosiloxane having at least about five siloxy unit.

24. The method of claim 23, wherein the bis-amino-terminated disiloxane, dianhydride having a symmetrical aromatic radical as its nucleus, and polydiorganosiloxane having at least five siloxy units are reacted with one another concurrently.

25. The method of claim 23, wherein the bis-amino-terminated disiloxane is reacted with the dianhydride having a symmetrical aromatic radical as its nucleus, and thereafter, the reaction product is further reacted with the polydiorganosiloxane having at least five siloxy units.

26. The method of claim 23, further comprising removing the solvent or mixture of solvents.

27. The method of claim 23, wherein the solvent is o-dichlorobenzene, chloroform, toluene, or benzene or a mixture of N-methyl pyrrolidone and toluene.

28. The method of claim 23, wherein the silicone-imide copolymer composition is formed in situ.

29. The method of claim 23, wherein an amide-acid prepolymer is formed and thereafter the silicone-imide copolymer composition is formed by heating said amide-acid prepolymer.

30. The method of claim 23, wherein the bis-amino-terminated disiloxane has the formula

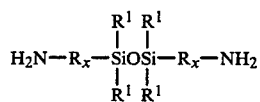

where R is a divalent substituted or unsubstituted alkylene or arylene radical; $R^1$ is an independently selected monovalent substituted or unsubstituted hydrocarbon radical; and x is equal to 0 or 1.

31. The method of claim 30, wherein R is a radical of the formula

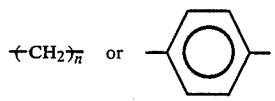

where n is an integer from 0 to 10.

32. The method of claim 31, wherein n is an integer from 1 to 5.

33. The method of claim 23, wherein the symmetrical aromatic radical nucleus of the dianhydride is selected from the group consisting of phenyl, naphthyl and anthracyl.

34. The method of claim 23, wherein per mole dianhydride having a symmetrical aomatic radical as its nucleus, there is utilized at least about 0.50 mole bis-amino-terminated disiloxane and less than about 0.50 mole polydiorganosiloxane having at least about five siloxy units.

35. The method of claim 23, wherein per mole dianhydride having a symmetrical aromatic radical as its nucleus, there is utilized at least about 0.70 mole bis-amino-terminated disiloxane and less than about 0.30 mole polydiorganosiloxane having at least about five siloxy units.

36. The method of claim 23 wherein the bis-amino-terminated disiloxane is symmetrical.

* * * * *